(12) United States Patent
Huang

(10) Patent No.: US 6,446,343 B1
(45) Date of Patent: Sep. 10, 2002

(54) STRUCTURE FOR IMPROVING EFFICIENCY OF A MOVABLE JAW OF A TREE PRUNER

(75) Inventor: Yao-Chung Huang, Chang Hua Hsien (TW)

(73) Assignee: Ho Cheng Garden Tools Co., Ltd., Chang Hua Hsien (TW)

( * ) Notice: Subject to any disclaimer, the term of this patent is extended or adjusted under 35 U.S.C. 154(b) by 0 days.

(21) Appl. No.: 09/904,121

(22) Filed: Jul. 13, 2001

(51) Int. Cl.[7] .............................................. B26B 13/06
(52) U.S. Cl. ........................ 30/249; 30/246; 30/245
(58) Field of Search ....................... 30/245, 246, 249, 30/261

(56) References Cited

U.S. PATENT DOCUMENTS

| | | | | |
|---|---|---|---|---|
| 3,835,535 A | * | 9/1974 | Robison et al. ................ 30/249 |
| 4,696,107 A | * | 9/1987 | Held ............................. 30/246 |
| 4,760,645 A | * | 8/1988 | Davis ........................... 30/249 |
| 5,743,018 A | * | 4/1998 | Wang ........................... 30/249 |
| 5,970,617 A | * | 10/1999 | Chang .......................... 30/249 |
| 6,385,852 B1 | * | 5/2002 | Huang .......................... 30/249 |

* cited by examiner

*Primary Examiner*—Hwei-Siu Payer
(74) *Attorney, Agent, or Firm*—Harrison & Egbert

(57) ABSTRACT

A tree pruner comprises a support rod, a base mounted on one end of the support rod, a fixed jaw fastened with the base, and a movable jaw pivoted with the fixed jaw. The fixed jaw is provided with an arresting projection. The movable jaw is provided with a first stop ridge and a second stop ridge which is separated from the first stop ridge by a distance. The movement of the movable jaw is confined by the first stop ridge and the second stop ridge in conjunction with the arresting projection of the fixed jaw.

2 Claims, 5 Drawing Sheets

STRUCTURE FOR IMPROVING EFFICIENCY OF A MOVABLE JAW OF A TREE PRUNER

BACKGROUND OF THE INVENTION

1. Field of the Invention

The present invention relates generally to a tree pruner, and more particularly to a structural improvement on a movable jaw of the tree pruner.

2. Description of Related Art

The conventional tree pruner comprises a support rod, a base fastened with one end of the support rod, a fixed jaw fastened with the base, and a movable jaw pivoted with the fixed jaw. Such conventional tree pruner as described above is defective in design in that the moving range of the movable jaw is excessively long, thereby undermining the efficiency of the movable jaw.

BRIEF SUMMARY OF THE INVENTION

The primary objective of the present invention is to provide a tree pruner which is free of the deficiency of the conventional tree pruner described above.

In keeping with the principle of the present invention, the foregoing objective of the present invention is attained by a tree pruner, which comprises a support rod, a base mounted on the end of the support rod, a fixed jaw fastened with the base, and a movable jaw pivoted with the fixed jaw. The fixed jaw is provided with an arresting projection. The movable jaw is provided with a first stop ridge and a second stop ridge which is separated from the first stop ridge by a predetermined distance. The moving range of the movable jaw is confined by the first stop ridge and the second stop ridge in conjunction with the arresting projection of the fixed jaw.

The foregoing objective, features, functions, and advantages of the present invention will be more readily understood upon a thoughtful deliberation of the following detailed description of the preferred embodiments of the present invention with reference to the accompanying drawings.

DETAILED DESCRIPTION OF THE INVENTION

Figure 1:
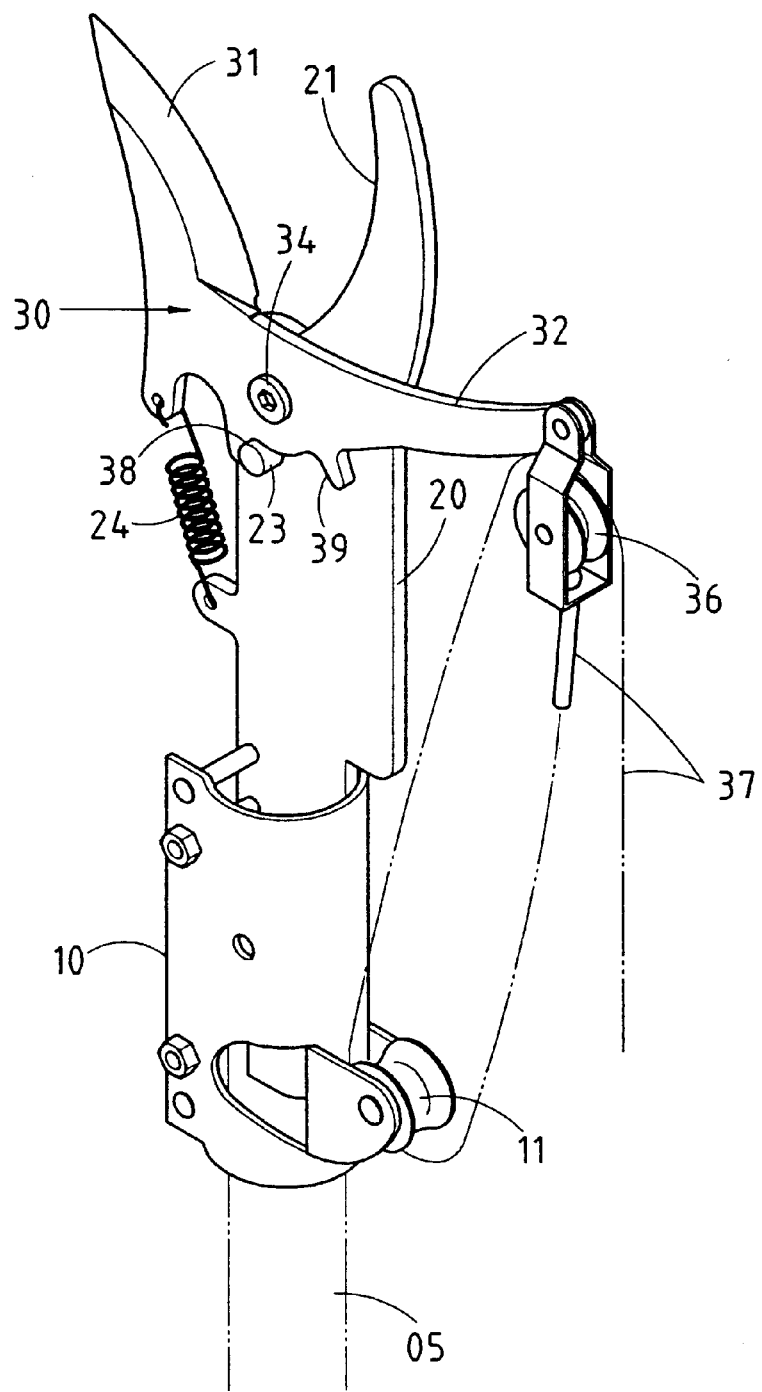
FIG. 1 shows a perspective view of a first preferred embodiment of the present invention.
Figure 2:
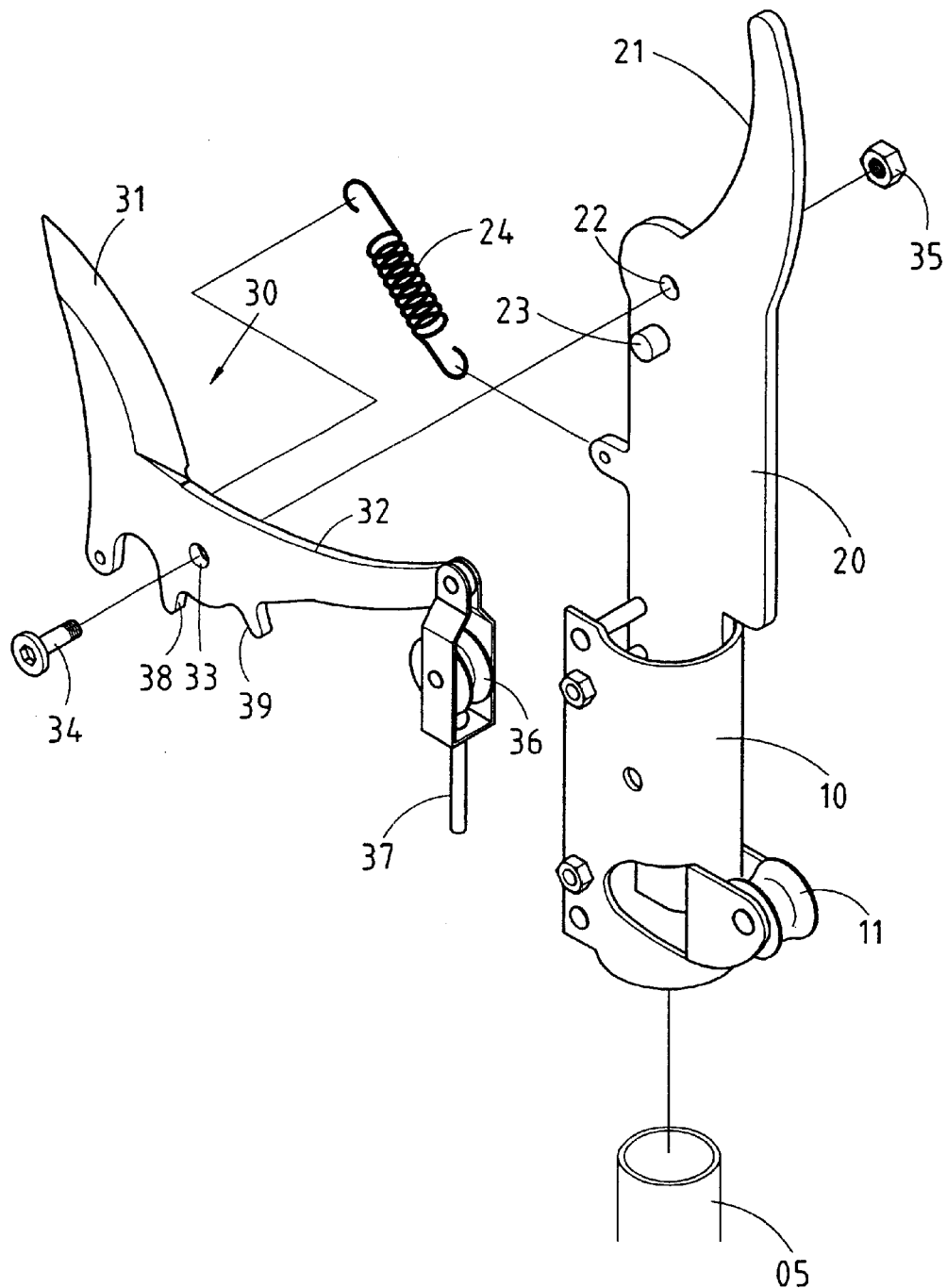
FIG. 2 shows an exploded view of the first preferred embodiment of the present invention.

As shown in FIGS. 1–4, a tree pruner of the first preferred embodiment of the present invention comprises a support rod 05, a base 10, a fixed jaw 20, and a movable jaw 30.

The base 10 is mounted on one end of the support rod 05 and is provided at the lower end with a first pulley 11.

The fixed jaw 20 is fastened at the lower end with the base 10 and is provided with a fixed jaw portion 21. The fixed jaw 20 is further provided in one side of the midsegment thereof with a pivoting hole 22 and an arresting projection 23 which is located in proximity of the pivoting hole 22. The fixed jaw 20 is further provided with a spring 24 whose one end is retained by the fixed jaw 20.

The movable jaw 30 has a blade 31, an extension arm 32, and a pivoting hole 33 corresponding in location to the pivoting hole 22 of the fixed jaw 20. The extension arm 32 is provided at the free end with a second pulley 36 and a pull cord 37 which runs in the second pulley 36 and the first pulley 11 of the base 10. The movable jaw 30 is provided with a first stop ridge 38 and a second stop ridge 39 which is separated from the first stop ridge 38 by a predetermined distance. The spring 24 is retained at other end thereof by the movable jaw 30.

In combination, the movable jaw 30 is pivotally fastened with the fixed jaw 20 by a bolt 34 and a nut 35 which is engaged with the bolt 34. The bolt 34 is put through the pivoting hole 33 of the movable jaw 30 and the pivoting hole 22 of the fixed jaw 20.

Figure 3:
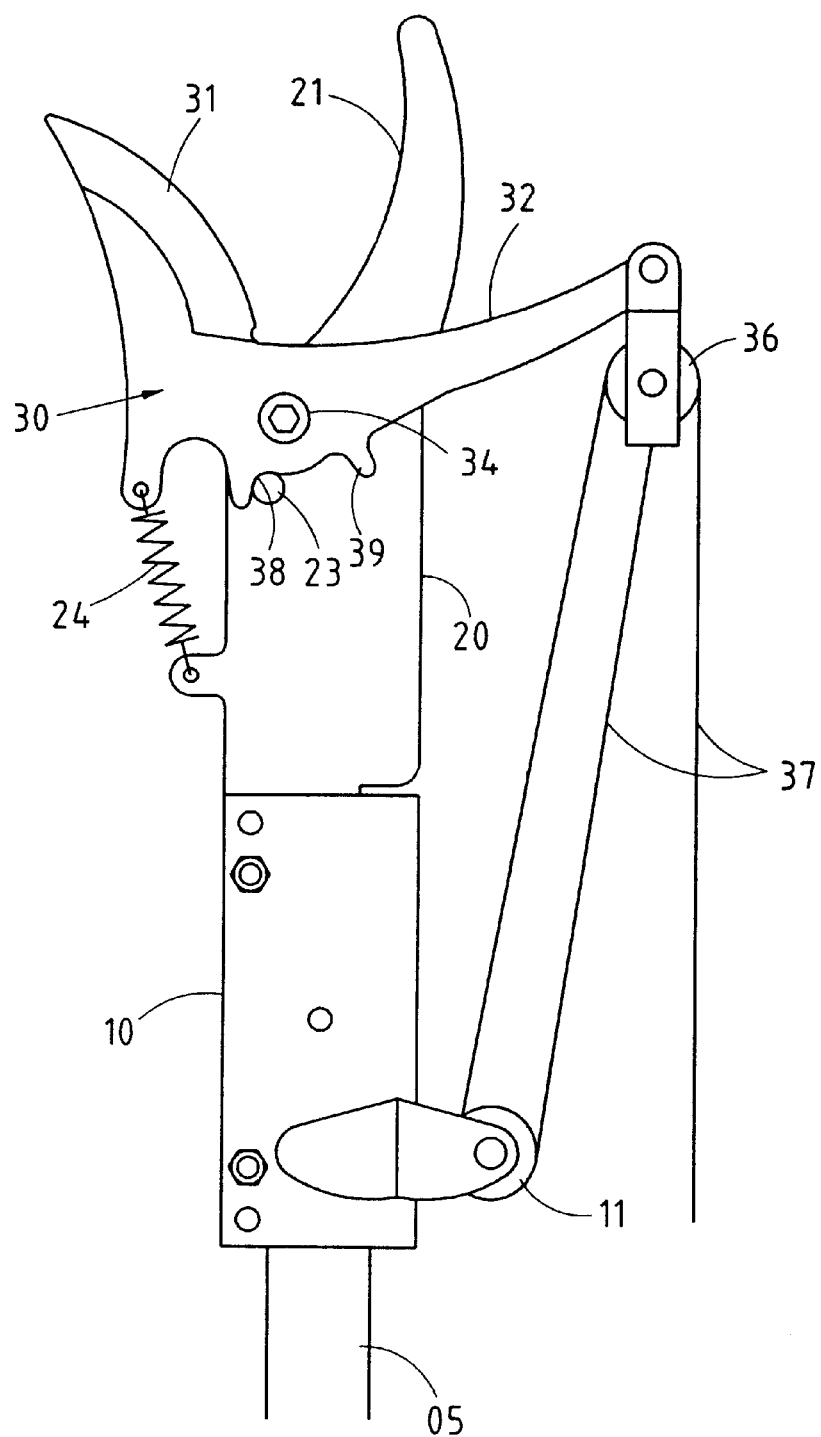
FIG. 3 shows a schematic view of the first preferred embodiment of the present invention in action.
Figure 4:
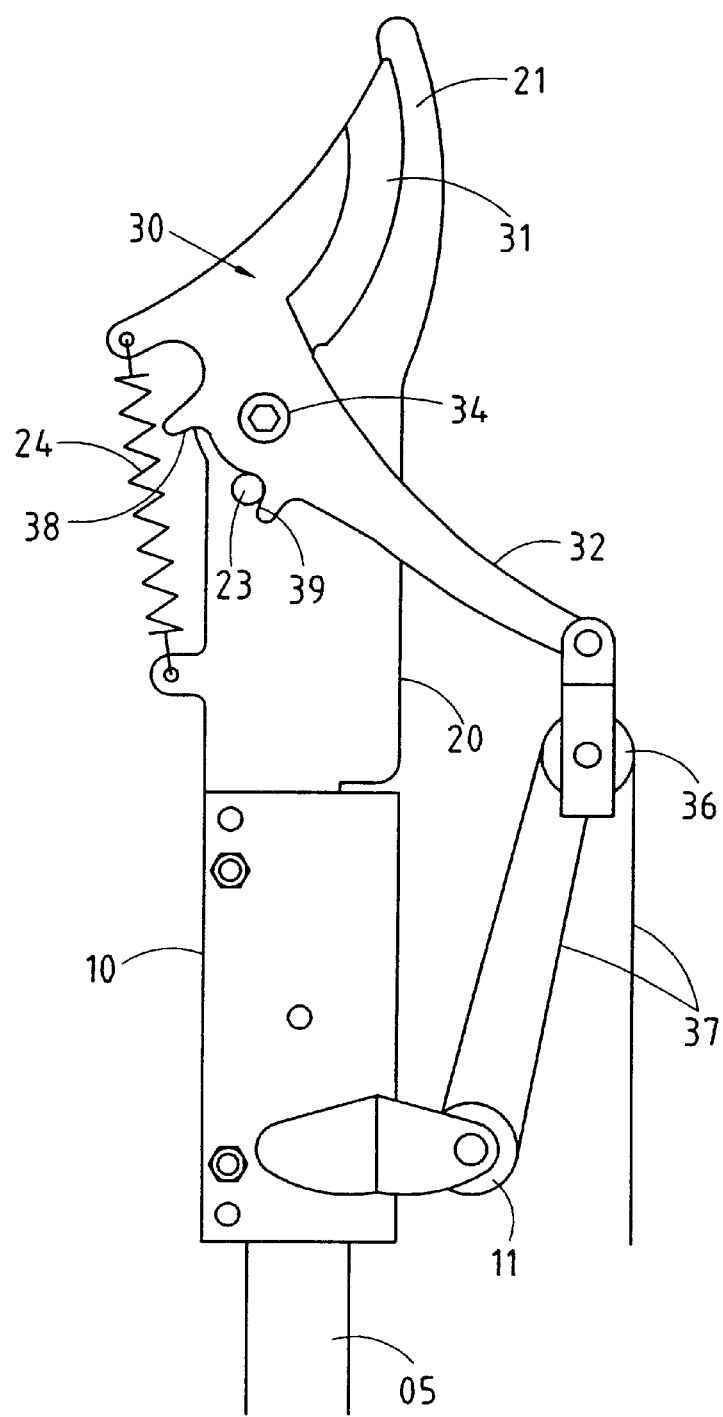
FIG. 4 shows another schematic view of the first preferred embodiment of the present invention in action.

In operation, the pull cord 37 is pulled to cause the blade 31 of the movable jaw 30 to move toward the fixed jaw portion 21 of the fixed jaw 20 so as to execute the cutting of a tree twig which is located between the blade 31 and the fixed jaw portion 21. The movable jaw 30 has a moving range which is corresponding to the distance between the first stop ridge 38 and the second stop ridge 39. In other words, the movement of the movable jaw 30 is confined by the first stop ridge 38 and the second stop ridge 39 in conjunction with the arresting projection 23 of the fixed jaw 20. Before the pull cord 37 is pulled, the blade 31 of the movable jaw 30 and the fixed jaw portion 21 of the fixed jaw 20 form an angle, as shown in FIG. 3. The tree twig is held in the angle before the pull cord 37 is pulled. As the pull cord 37 is pulled, the blade 31 of the movable jaw 30 is actuated to move toward the fixed jaw portion 21 of the fixed jaw 20, as shown in FIG. 4. The severance of the tree twig is attained by a joint effort of the blade 31 of the movable jaw 30 and the fixed jaw portion 21 of the fixed jaw 20. Upon completion of the severance of the tree twig, the pull cord 37 is let go to allow the blade 31 of the movable jaw 30 to move away from the fixed jaw portion 21 of the fixed jaw 20 by virtue of the spring force of the spring 24. The return movement of the blade 31 of the movable jaw 30 is confined by the first stop ridge 38 of the movable jaw 30 in conjunction with the arresting projection 23 of the fixed jaw 20, as shown in FIG. 3.

Figure 5:
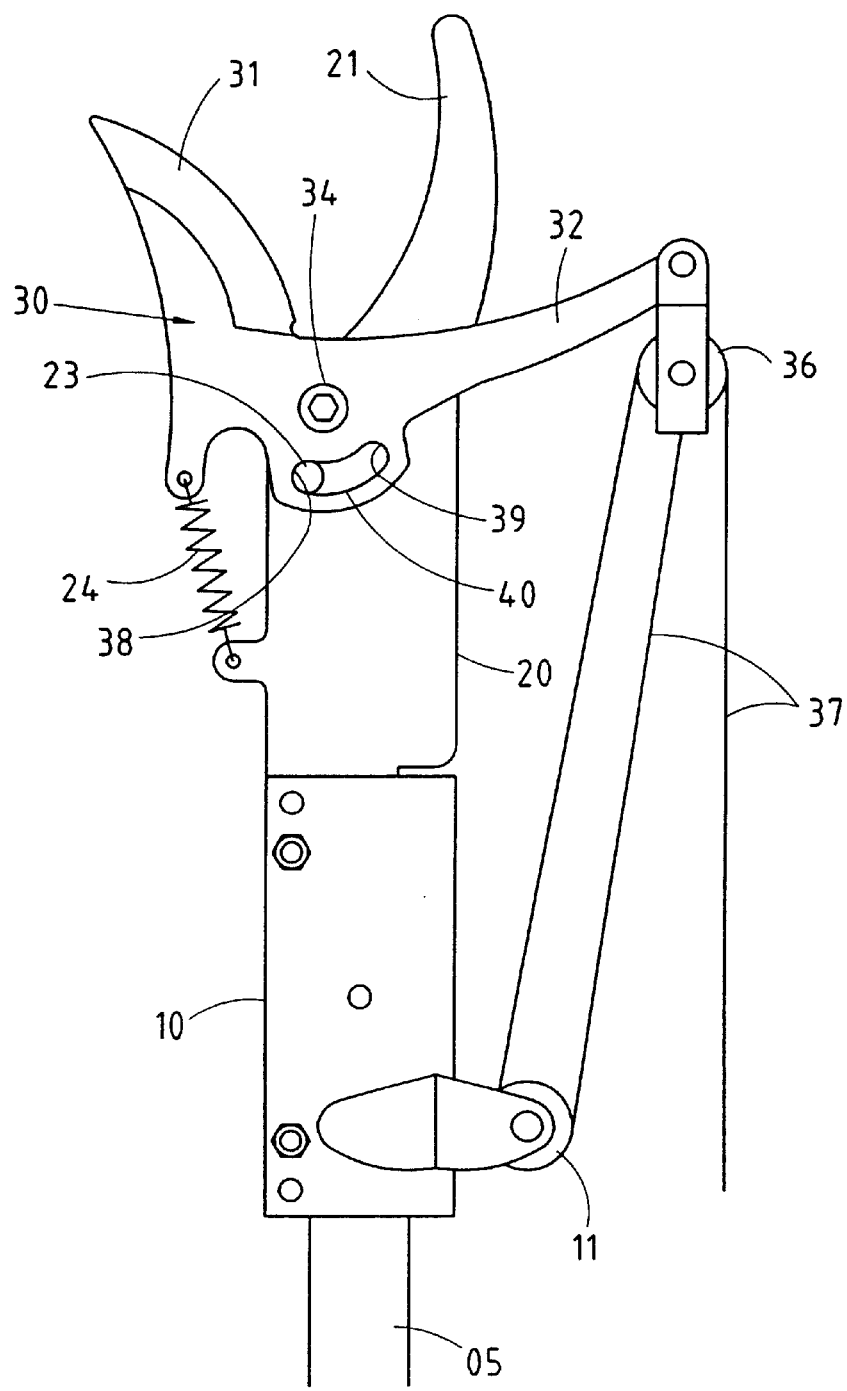
FIG. 5 shows a perspective view of a second preferred embodiment of the present invention.

As shown in FIG. 5, a tree pruner of the second preferred embodiment of the present invention is basically similar in construction to the tree pruner of the first preferred embodiment described above, except that the movable jaw 30 of the tree pruner of the second preferred embodiment of the present invention is provided with an arcuate guide slot 40 in place of the first stop ridge 38 and the second stop ridge 39 of the first preferred embodiment. However, one end of the arcuate guide slot 40 of the movable jaw 30 of the second preferred embodiment is functionally corresponding to the first stop ridge 38, whereas other end of the arcuate guide slot 40 is functionally corresponding to the second stop ridge 39, as illustrated in FIG. 5. In other words, the length of the arcuate guide slot 40 is corresponding to the distance between the first stop ridge 38 and the second stop ridge 39.

In light of the movement of the movable jaw 30 of the present invention being confined by the first stop ridge 38 and the second stop ridge 39, or the arcuate guide slot 40 in conjunction with the arresting projection 23 of the fixed jaw 20, the pulling distance of the pull cord 37 is thus confined to make the chore of pruning a tree less tiresome.

The embodiments of the present invention described above are to be regarded in all respects as being merely illustrative and not restrictive. Accordingly, the present invention may be embodied in other specific forms without deviating from the spirit thereof. The present invention is therefore to be limited only by the scopes of the following claims.

I claim:

1. A tree pruner comprising a support rod;

a base fastened with one end of said support rod and provided with a first pulley fastened thereto;

a fixed jaw fastened at one end with said base and provided at other end with a fixed jaw portion, said fixed jaw further provided at a midsegment with a pivoting hole;

a movable jaw having at one end thereof a blade, and at other end thereof an extension arm which is provided at a free end thereof with a second pulley fastened thereto, said movable jaw provided with a pivoting hole corresponding in location to said pivoting hole of said fixed jaw, said movable jaw being pivoted with said fixed jaw by a bolt which is received in said pivoting hole of said movable jaw and said pivoting hole of said fixed jaw, with said blade of said movable jaw being opposite in location to said fixed jaw portion of said fixed jaw;

a spring retained at one end thereof by said fixed jaw, and at other end thereof by said movable jaw, said spring serving to provide said movable jaw with a spring force enabling said movable jaw to return to an original position thereof; and a pull cord running through said first pulley of said base and said second pulley of said extension arm of said movable jaw;

wherein said fixed jaw is provided with an arresting projection; and wherein said movable jaw is provided with a first stop ridge, and a second stop ridge separated from said first stop ridge by a distance whereby movement of said movable jaw is confined to the distance between said first stop ridge and said second stop ridge such that said second stop ridge is stopped by said arresting projection of said fixed jaw in the course of movement of said blade toward said fixed jaw, and that said first stop ridge is stopped by said arresting projection of said fixed jaw in the course of movement of said blade away from said fixed jaw.

2. The tree pruner as defined in claim 1, wherein said movable jaw is provided with an arcuate guide slot of a length, said guide slot having a first end and a second end whereby movement of said movable jaw is confined to the length between said first end and said second end such that said second end is stopped by said arresting projection of said fixed jaw in the course of movement of said blade toward said fixed jaw, and that said first end is stopped by said arresting projection of said fixed jaw in the course of movement of said blade away from said fixed jaw.

* * * * *